(12) United States Patent
Kim et al.

(10) Patent No.: US 12,735,021 B2
(45) Date of Patent: Sep. 15, 2026

(54) STEERING DEVICE FOR VEHICLE

(71) Applicants: Hyundai Motor Company, Seoul (KR); Kia Corporation, Seoul (KR)

(72) Inventors: Dong Joo Kim, Seongnam-Si (KR); Eun Sung Choi, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 126 days.

(21) Appl. No.: 18/797,391

(22) Filed: Aug. 7, 2024

(65) Prior Publication Data

US 2025/0222913 A1 Jul. 10, 2025

(30) Foreign Application Priority Data

Jan. 5, 2024 (KR) ........................ 10-2024-0002176

(51) Int. Cl.

*B60W 10/20* (2006.01)
*B60W 50/14* (2020.01)
*B62D 1/183* (2006.01)
*B62D 1/187* (2006.01)

(52) U.S. Cl.

CPC ............ *B60W 10/20* (2013.01); *B60W 50/14* (2013.01); *B62D 1/183* (2013.01); *B62D 1/187* (2013.01); *B60W 2420/40* (2013.01)

(58) Field of Classification Search

None

See application file for complete search history.

(56) References Cited

U.S. PATENT DOCUMENTS 6,068,295 A * 5/2000 Skabrond ............... B60K 37/10 296/73
8,899,623 B2 * 12/2014 Stadler ................... B62D 1/192 280/775
9,963,035 B2 * 5/2018 El Aile .................. B60K 35/10
10,071,684 B2 9/2018 Gascón Rivera et al.
10,322,682 B2 * 6/2019 Faist ...................... B60K 35/10
10,343,555 B2 * 7/2019 Tan ........................ B60K 35/10
10,442,455 B2 * 10/2019 McKinzie .............. B62D 1/181
10,583,740 B2 * 3/2020 Ory ......................... B60K 35/10
10,988,161 B2 * 4/2021 Krstic .................... B62D 1/189
11,198,464 B2 * 12/2021 Watanabe .............. B62D 1/183
11,214,293 B2 * 1/2022 Nishimura ............. B62D 1/187
11,292,504 B2 * 4/2022 Palm ...................... B60K 26/02
11,613,295 B1 * 3/2023 Harmon ................. B60K 35/10 280/775

(Continued)

FOREIGN PATENT DOCUMENTS

CN 106184366 A * 12/2016 ........... G05D 1/0061
CN 106256651 A * 12/2016 ............. B62D 1/105

(Continued)

*Primary Examiner* — Kevin R Steckbauer
(74) *Attorney, Agent, or Firm* — MORGAN, LEWIS & BOCKIUS LLP

(57) ABSTRACT

A steering device for a vehicle includes: a rail provided on a dashboard of the vehicle; a base unit engaged to the rail to be movable along the rail; a steering unit coupled to the base unit and configured to adjust a moving direction of the vehicle; and a controller operatively connected to the base unit and the steering unit and configured to adjust at least one of a position of the base unit and a tilting angle of the steering unit.

20 Claims, 6 Drawing Sheets

(56) References Cited

U.S. PATENT DOCUMENTS 11,667,321 B2 * 6/2023 Harmon ................. B60K 35/10 74/493
11,667,324 B2 * 6/2023 Ahn ....................... B60K 23/00 180/326
11,772,700 B2 10/2023 Lisseman et al.
11,801,884 B2 * 10/2023 Palm ...................... B60K 26/02
11,827,269 B2 * 11/2023 Ahn ....................... B60K 35/60
11,932,154 B2 * 3/2024 Salter ..................... B60K 35/22
12,049,250 B2 * 7/2024 Salter ....................... B62D 1/04
12,351,232 B2 * 7/2025 Cimatti .................... B62D 1/06
2014/0028008 A1 * 1/2014 Stadler ................... B62D 1/192 280/777
2014/0263511 A1 * 9/2014 Clements .................. B60R 7/06 224/483
2014/0277896 A1 * 9/2014 Lathrop ................. B60K 35/10 74/484 R
2016/0347348 A1 * 12/2016 Lubischer ................ B62D 1/02
2016/0375924 A1 * 12/2016 Bodtker ................. B60K 35/10 74/552
2016/0375926 A1 * 12/2016 Lubischer .............. B62D 1/183 74/493
2017/0297606 A1 * 10/2017 Kim ....................... B62D 1/185
2017/0341678 A1 * 11/2017 Dekker .................... B62D 1/04
2018/0370559 A1 * 12/2018 Swamidason .......... B62D 1/181
2019/0016365 A1 * 1/2019 Swamidason .......... B60K 35/10
2019/0225253 A1 * 7/2019 Heusinger .............. B60K 35/10
2019/0308655 A1 * 10/2019 Ochi ...................... B62D 1/181
2020/0023882 A1 * 1/2020 Krstic .................... B62D 1/183
2020/0101998 A1 * 4/2020 Nishimura ................ G06T 7/70
2020/0122767 A1 * 4/2020 Reidel ...................... B62D 1/08
2020/0172145 A1 * 6/2020 Hirschfeld ............. B60K 35/10
2020/0269900 A1 * 8/2020 Kawaguchi .............. B62D 1/06
2020/0298900 A1 * 9/2020 Palm ...................... B60K 26/02
2021/0016820 A1 * 1/2021 Nozawa ................... B62D 1/10
2021/0031822 A1 * 2/2021 Watanabe .............. B60K 35/10
2021/0031823 A1 * 2/2021 Watanabe .............. B62D 1/183
2022/0009541 A1 * 1/2022 Bowen .................. B62D 1/183
2022/0185361 A1 * 6/2022 Palm ...................... B60K 26/02
2022/0274639 A1 * 9/2022 Park ....................... B62D 1/185
2022/0315093 A1 * 10/2022 Ahn ....................... B60K 35/60
2022/0371648 A1 * 11/2022 Ahn ....................... B60K 23/00
2023/0100937 A1 * 3/2023 Harmon ................. B60K 35/10 280/775
2023/0112361 A1 * 4/2023 Harmon ................. B60K 35/10 74/493
2023/0182807 A1 * 6/2023 Yang .................... B62D 15/027 701/41
2024/0001983 A1 * 1/2024 Salter ....................... B62D 1/04
2024/0025322 A1 * 1/2024 Salter ..................... B60K 35/22
2024/0300566 A1 * 9/2024 Cimatti .................... B62D 1/06
2025/0026396 A1 * 1/2025 Soderlind .............. B62D 1/183
2025/0222913 A1 * 7/2025 Kim ...................... B60W 10/20
2026/0077650 A1 * 3/2026 Xiao ...................... B60K 35/53

FOREIGN PATENT DOCUMENTS

CN 106335460 A * 1/2017 ......... B60R 21/2338
CN 106184366 B * 5/2019 ........... G05D 1/0061
CN 106256651 B * 6/2019 ............. B62D 1/105
CN 111717268 A * 9/2020 ............. B60K 35/60
CN 215600291 U 1/2022
CN 114906205 A * 8/2022 ............. B62D 1/184
CN 115871770 A * 3/2023 ............. B60K 35/22
CN 115892191 A * 4/2023 ............. B60K 35/10
CN 112829819 B * 8/2023 ............... B62D 1/16
CN 120187610 A * 6/2025 ........... B60R 16/027
DE 102016011461 A1 * 4/2017 ............. B60K 35/65
DE 102015119185 A1 * 5/2017 ............... B62D 1/06
DE 102015225522 A1 * 6/2017 ............. B62D 5/001
DE 102016210622 A1 * 12/2017 ................ B60T 7/06
DE 102017128739 A1 * 6/2018 ............. B62D 1/286
DE 102018222700 A1 * 6/2020 ............. B60K 35/53
DE 102019112875 A1 * 11/2020 ............. B60K 35/60
DE 102020200409 A1 * 7/2021 ............. B60K 35/53
DE 102020107156 A1 * 9/2021 ............... B62D 1/10
DE 102022124807 A1 * 3/2023 ............. B60K 35/10
DE 102020107156 B4 * 4/2023 ............... B62D 1/10
DE 102024120199 A1 * 1/2025 ............. B62D 1/185
DE 102023208100 A1 * 2/2025 ............. B62D 5/006
DE 102024123470 A1 * 7/2025 ............. B62D 1/187
EP 0802105 A2 * 10/1997 ............. B62D 1/181
EP 0802105 B1 * 12/2001 ............. B62D 1/181
EP 1283146 A2 * 2/2003 ............. B62D 1/197
EP 3042825 A1 * 7/2016 ............. B62D 1/181
EP 3597506 A1 * 1/2020 ............. B62D 1/286
EP 3628565 A1 * 4/2020 ............... G06T 7/70
EP 3712035 A2 * 9/2020 ............. B60K 35/60
EP 3778352 A1 * 2/2021 ............. B62D 1/181
EP 3800108 A1 * 4/2021 ............... B62D 1/06
EP 3800109 A1 * 4/2021 ............... B62D 1/08
EP 3800110 A1 * 4/2021 ............... B62D 1/10
EP 3597506 B1 * 5/2021 ............. B62D 1/189
EP 4039561 A2 * 8/2022 ............. B62D 1/184
EP 3712035 B1 * 8/2023 ............. B60K 35/60
EP 3898301 B1 * 11/2023 ............. B60K 35/53
FR 2779695 A1 * 12/1999 ............. B60K 35/53
FR 2806042 A1 * 9/2001 ............. B60K 37/20
FR 2861657 A1 * 5/2005 ......... B60R 11/0235
FR 3033305 A1 * 9/2016 ............. B62D 1/183
FR 3033306 A1 * 9/2016 ............. B62D 1/183
FR 3033307 A1 * 9/2016 ............. B62D 1/183
FR 3066462 A1 * 11/2018 ............. B62D 1/183
FR 3066462 B1 * 7/2019 ............... B62D 1/04
JP 4448559 B2 * 4/2010 ............. B62D 1/185
JP 2018108746 A * 7/2018
JP 2019182041 A * 10/2019
JP 2019182054 A * 10/2019 ............. B62D 1/183
JP 2021020581 A * 2/2021 ............... B62D 1/19
JP 2021020583 A * 2/2021 ............. B60K 35/10
JP 2021020584 A * 2/2021
JP WO2019193956 A1 * 4/2021 ............. B62D 1/181
JP 2021109611 A * 8/2021 ............. B62D 1/183
JP 2022191707 A * 12/2022
JP 7268524 B2 * 5/2023
JP 2023104296 A * 7/2023
JP 7363498 B2 * 10/2023 ............. B62D 1/183
JP 7380548 B2 * 11/2023 ............... B62D 1/10
KR 20050025427 A * 3/2005
KR 20050047893 A * 5/2005
KR 20220114999 A * 8/2022 ............. B62D 1/184
KR 20220115005 A * 8/2022 ........... B60K 35/658
KR 20220136013 A * 10/2022 ............... B60R 7/04
KR 20220136014 A * 10/2022 ............... B60R 7/04
KR 20230000837 A * 1/2023 ............. B62D 1/181
KR 10-2023-0022421 2/2023
KR 20230060316 A * 5/2023 ............. B60N 3/001
KR 20250082136 A * 6/2025 ............. B60K 35/22
KR 20250105762 A * 7/2025 ......... F16H 25/2204
KR 20250107507 A * 7/2025 ............. B62D 1/187
KR 20250142626 A * 9/2025 ........... B60R 16/023
WO WO-03020571 A1 * 3/2003 ......... B60R 25/0227
WO WO-2020126919 A1 * 6/2020 ............. B60K 35/60
WO WO-2025004143 A1 * 4/2021 ............... B62D 1/19
WO WO2022-254304 A1 12/2022
WO WO-2022264295 A1 * 12/2022 ............. B62D 1/183
WO WO-2022264296 A1 * 12/2022 ............. B62D 1/183

* cited by examiner

FIG. 4

STEERING DEVICE FOR VEHICLE

CROSS-REFERENCE TO RELATED APPLICATION(S)

The present application claims priority to Korean Patent Application No. 10-2024-0002176, filed on Jan. 5, 2024, the entire contents of which is incorporated herein for all purposes by this reference.

BACKGROUND OF THE PRESENT DISCLOSURE

Field of the Present Disclosure

The present disclosure relates to a steering device for a vehicle, and to a steering device which is movable on a rail provided on a dashboard.

Description of Related Art

With the development of data processing technology and detecting technology for the surrounding environment, vehicles have reached a level of technology that allows the vehicles to drive on their own. Accordingly, various research is underway to enable the steering device, which steers a vehicle, to perform functions other than steering when the vehicle is driven in an autonomous driving mode or when the driver takes a break in the vehicle even while making the steering device perform the role of a steering device.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a steering device which is configured for including various functions, and is to provide a vehicle steering device which is configured for increasing user convenience due to a plurality of modes such as an autonomous driving mode, a manual driving mode, and the like.

In view of the foregoing, a vehicle steering device according to an exemplary embodiment of the present disclosure includes: a rail provided on a dashboard of the vehicle; a base unit engaged to the rail to be movable along the rail; a steering unit coupled to the base unit and configured to adjust a moving direction of the vehicle; and a controller operatively connected to the base unit and the steering unit and configured to adjust at least one of a position of the base unit and a tilting angle of the steering unit.

The steering unit may include a steering wheel configured to adjust the moving direction of the vehicle and a steering column coupled to the base unit to interconnect the steering wheel and the base unit.

The steering wheel may include, on the rear surface thereof, a lamp configured to emit light or a speaker configured to emit sound.

The steering wheel may include, on the front surface thereof, a touch sensor configured to control ON/OFF of the lamp.

The touch sensor may be configured to determine whether a driver is holding the steering wheel when the vehicle is in a semi-autonomous driving mode.

A plurality of lamps may be provided, and when the vehicle changes lanes or turns left or right, a lamp located in the corresponding direction may blink.

When the vehicle is determined to be in an emergency situation, including crossing a center line or unintentionally changing lanes, sound at a frequency that causes vibration in the steering wheel may be emitted.

The steering wheel may include, in the center of a front surface thereof, a holder on which a user communication terminal configured to communicate with the vehicle is mounted.

The holder may be provided with a wireless charging system therein to wirelessly charge the user communication terminal when the mounted user communication terminal supports wireless charging.

The user communication terminal mounted on the holder may be configured to display vehicle status information including a vehicle speed, a capacity of a battery mounted on the vehicle, or a fuel residual amount.

The steering device may further include a steer-by-wire (SBW) system, in which the base unit may be provided with a first connector, the steering unit may be provided with a second connector, the first connector and the second connector may be connected to each other to electrically interconnect the base unit and the steering unit, and the first connector may be configured to transmit a steering signal generated from the steering unit, to the SBW system.

The base unit may be provided with a sliding motor engaged to the rail and configured to move the base unit along the rail.

The steering unit or the base unit may be provided with a tilting motor engaged to the steering unit and configured to adjust the tilting angle of the steering unit.

The steering unit or the base unit may be provided with a telescopic motor configured to adjust the length of the steering unit in a predetermined direction thereof.

A passengers of a vehicle may be able to select one of a plurality of modes, including the autonomous driving mode of the vehicle, via a user communication terminal or a controller configured for communicating with the vehicle.

When the vehicle is in the autonomous driving mode, the base unit may be slid along the rail away from the driver.

When switching the vehicle from the autonomous driving mode to a manual driving mode or canceling the autonomous driving mode, the base unit may be slid along the rail toward the driver.

During an internal mode, a lamp provided on a rear surface of the steering wheel included in the steering unit may emit light toward the dashboard, or the speaker mounted on the rear surface of the steering wheel may emit sound.

During a content watching mode, the angle between the base unit and the steering unit may be 90 degrees or less than the 90 degrees, and the base unit may be slid along the rail and spaced from the driver with a predetermined distance.

The steering unit may be configured to be attachable/detachable to/from the base unit and be installable at a plurality of points within the vehicle.

The base unit may be configured so that a plurality of accessories including a cup holder configured to be heated or refrigerated may be attached to or detached from the base unit.

According to a plurality of steering devices of the present disclosure, user convenience may be increased depending on a plurality of modes such as an autonomous driving mode and a manual driving mode.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3, FIG. 4, and FIG. 5 are views exemplarily illustrating the states of the steering device for a vehicle depending on vehicle driving modes, respectively.

DETAILED DESCRIPTION

Figure 1:
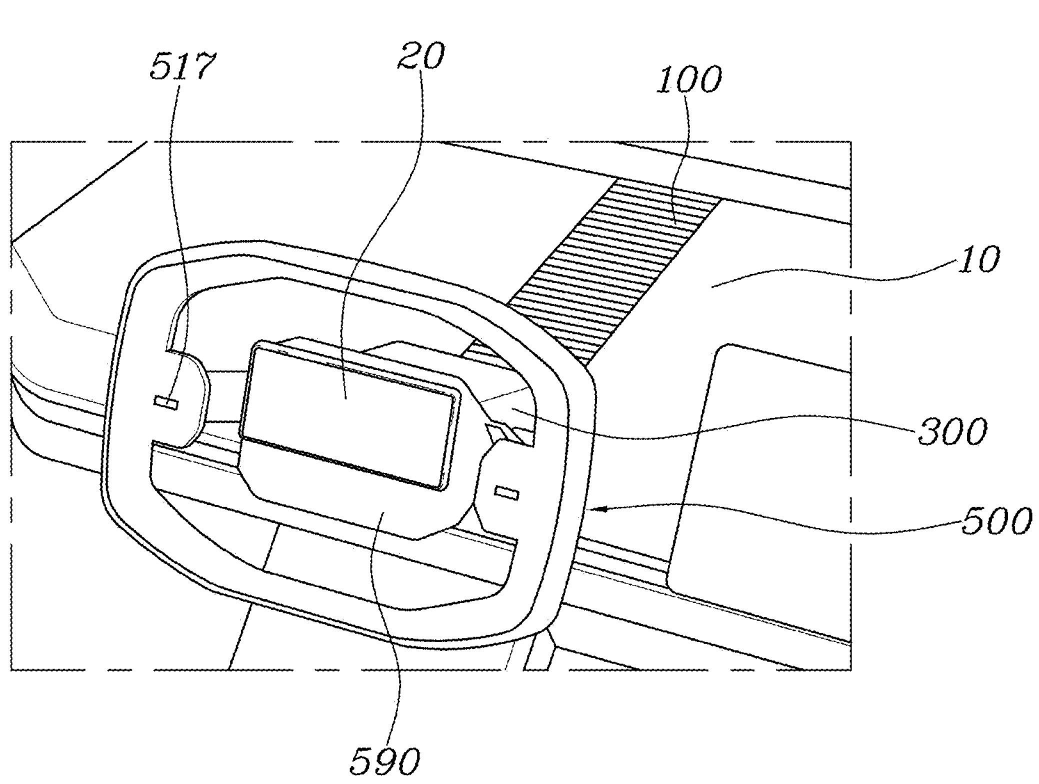
FIG. 1 is a view exemplarily illustrating a steering device for a vehicle corresponding to an exemplary embodiment of the present disclosure.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments set forth in the present specification will be described in detail with reference to the accompanying drawings, and the same or similar elements are provided the same and similar reference numerals, so duplicate descriptions thereof will be omitted.

In describing the exemplary embodiments set forth herein, a detailed description of known functions or configurations incorporated herein will be omitted when it is determined that the description may make the subject matter of the present disclosure unnecessarily unclear. Furthermore, it should be appreciated that the accompanying drawings are provided only for the sake of easy understanding of the exemplary embodiments set forth herein, and the technical idea of the present disclosure is not limited to the accompanying drawings and includes all modifications, equivalents, or alternatives falling within the spirit and scope of the present disclosure.

Terms including an ordinal number such as “a first” and “a second” may be used to describe various elements, but the elements are not limited to the terms. These terms are intended merely to distinguish one element and from other elements.

A singular expression may include a plural expression unless they are definitely different in a context.

As used herein, the expression “comprise”, “include” or “have” are intended to specify the existence of mentioned features, numbers, steps, operations, elements, components, or combinations thereof, and should be construed as not precluding the possible existence or addition of one or more other features, numbers, steps, operations, elements, components, or combinations thereof.

The terms “module” and “unit” used for the elements in the following description are provided or interchangeably used in consideration of only the ease of writing the specification, and do not have distinct meanings or roles by themselves.

In the case where an element is referred to as being “connected” or “coupled” to any other element, it should be understood that not only the element is directly connected or coupled to the other element, but also another element may exist therebetween. Contrarily, in the case where an element is referred to as being “directly connected” or “directly coupled” to any other element, it should be understood that no element exists therebetween.

A controller may include a communication device that communicates with other controllers or sensors to control functions in charge, a memory that stores an operating system or logic instructions, input/output information, and the like, and one or more processors that perform determinations, computations, decisions, and the like.

Figure 2:
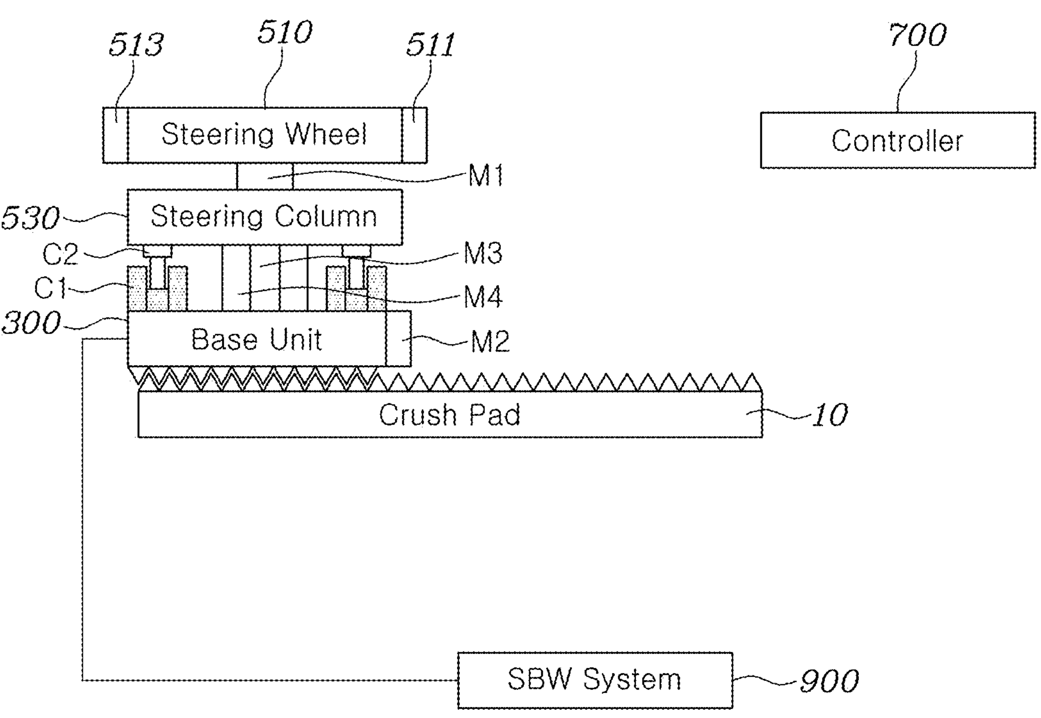
FIG. 2 is a block diagram illustrating the relationship of components of the steering device for a vehicle.

FIG. 1 is a view exemplarily illustrating a steering device for a vehicle corresponding to an exemplary embodiment of the present disclosure, and FIG. 2 is a block diagram illustrating the relationship of components of the steering device for a vehicle.

A rail 100 is provided on a dashboard 10 of a vehicle. The rail 100 is provided on the top surface of the dashboard 10 to cross the dashboard 10 in the width direction, or may be provided to cross the dashboard 10 in the longitudinal direction.

The rail 100 is a path along which the steering unit 500, which adjusts the moving direction of the vehicle, moves, and is provided with a base unit 300 which is movable along the rail 100. One end portion of the base unit 300 is coupled to the rail 100, and the other end portion of the base unit 300 is coupled to the steering unit 500, and when the base unit 300 moves along the rail 100, the steering unit 500 coupled to the base unit 300 is also movable along the rail 100. As will be described later, the base unit 300 is provided with a sliding motor, and the base unit 300 may be moved by operation of the sliding motor. The base unit 300 is provided with a pinion gear and the rail is provided with a rack gear, so that the base unit may be moved.

Of course, to move the base unit 300 on the rail, a known method such as a ball nut-screw method may be used.

The steering unit 500 is coupled to the base unit 300 to be tiltable around the base unit 300.

Furthermore, the controller 700 electrically connected to the base unit 300 may move the base unit 300 on the rail 100 to adjust the position of the base unit 300 or adjust the tilting angle of the steering unit 500.

As will be described later, the steering unit 500 and the base unit 300 may be connected to each other hingedly, and a tilting motor may be coupled to the hinge axis, so that the tilting angle of the steering unit may be adjusted by operating the tilting motor.

With the above-described configuration, the position of the steering unit 500 within the dashboard 10 is adjustable, and in the autonomous driving mode of the vehicle in which the steering unit 500 is not used or the state in which the vehicle is not driven, the tilting angle of the steering unit 500 may be adjusted to move the steering unit 500 so that the steering unit 500 may be located on the dashboard 10.

Figure 3:
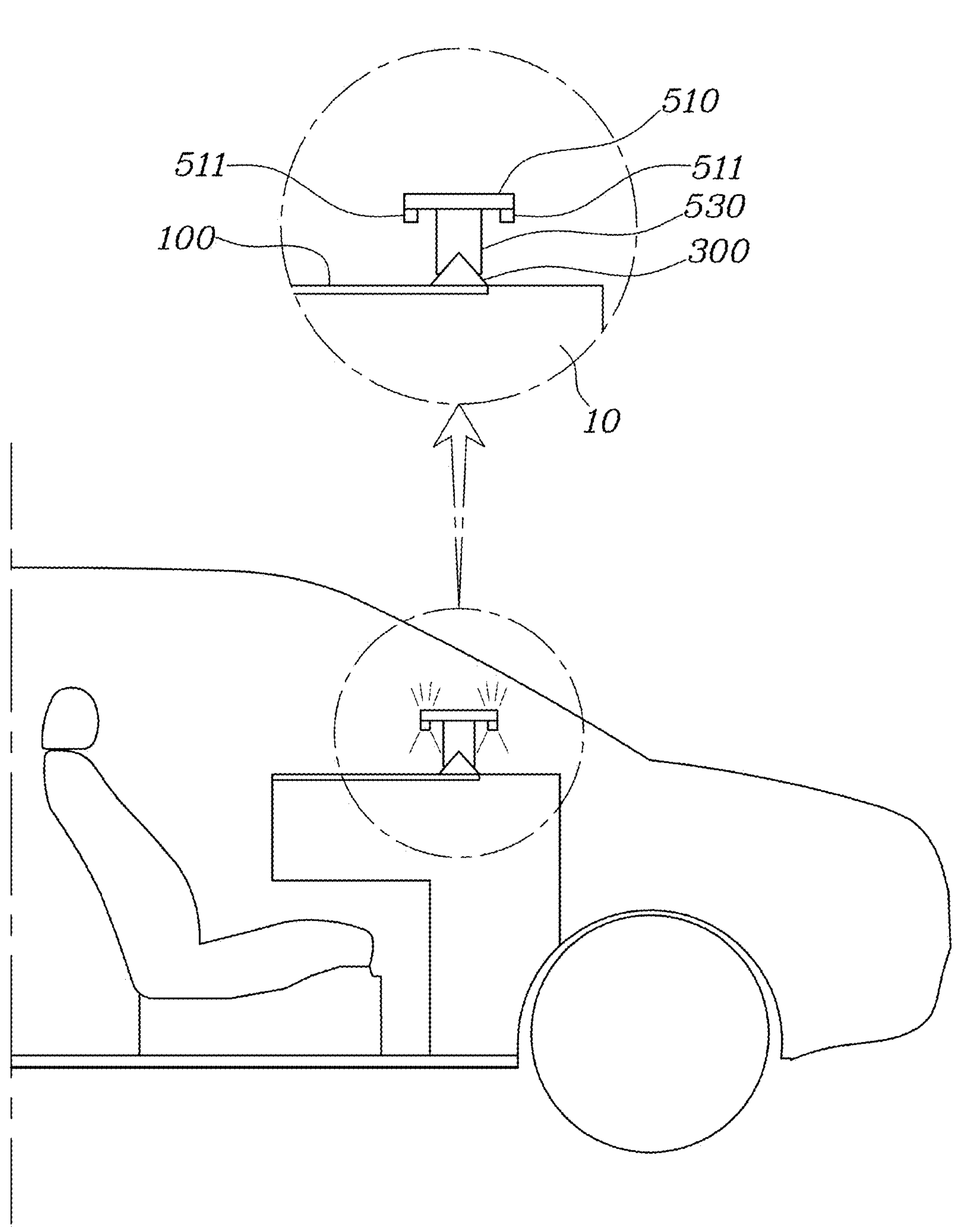
Figure 4:
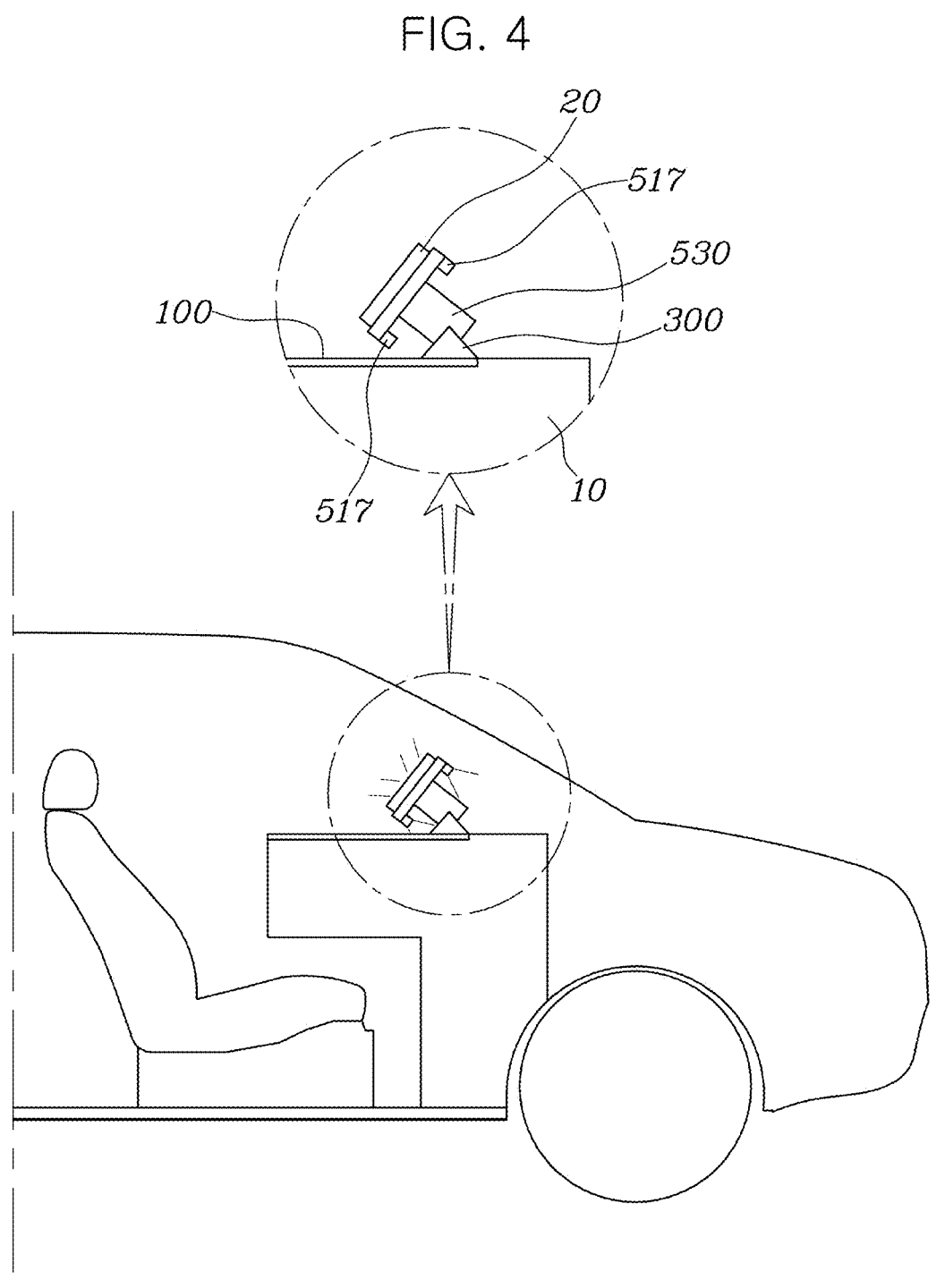
Figure 5:
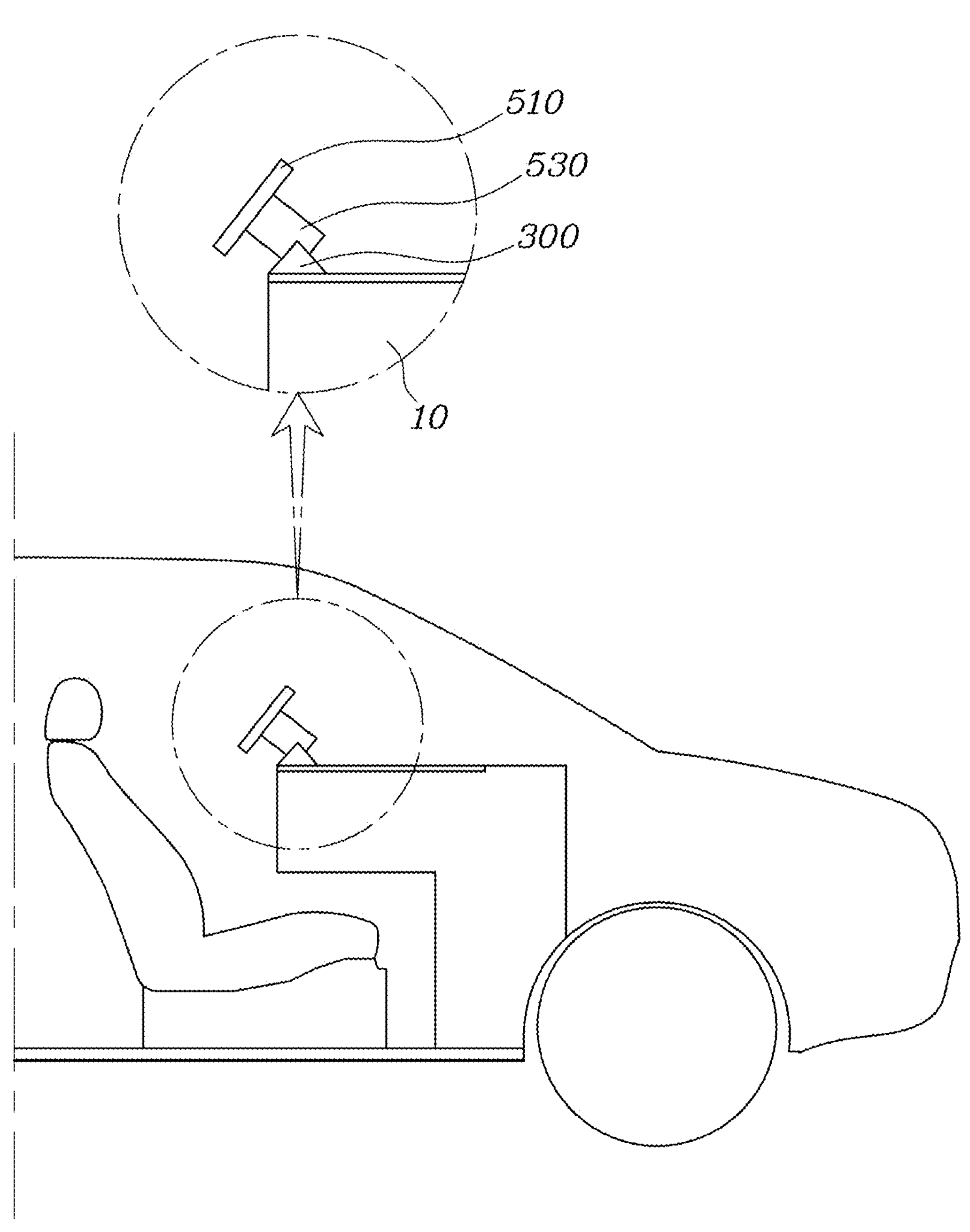

That is, referring to FIG. 3, FIG. 4, and FIG. 5, as illustrated in FIG. 3, when the vehicle is not driven or is driven in the autonomous driving mode, the steering unit 500 may be moved away from the driver and perform an additional function.

Furthermore, as illustrated in FIG. 4, a user communication terminal 20 or the like may be mounted on a holder 590, which will be described later, and to view content of the user communication terminal 20, the steering unit 500 may be spaced from the driver with a predetermined distance, and the tilting angle of the steering unit 500 may be adjusted to an angle suitable for the driver to watch video of the user communication terminal 20.

In contrast, as illustrated in FIG. 5, when the vehicle is driven in the manual driving mode, the steering unit 500 may be located close to the driver so that the driver can steer the vehicle by use of the steering unit 500.

At the present time, the position of the base unit 300 may be adjusted, and the tilting angle of the steering unit 500 can also be adjusted, allowing each driver to set the optimal manual driving mode.

Meanwhile, the steering unit 500 may include a steering column 530 coupled to the steering wheel 510, which adjusts the moving direction of the vehicle, and the base unit 300 to interconnect the steering wheel 510 and the base unit 300.

The vehicle driving device according to an exemplary embodiment of the present disclosure may further include a steer-by-wire (SBW) system 900, and the tilt angle of the wheel may be varied by the SBW system 900.

The SBW system 900 is a vehicle wheel steering device that enables a mechanical connection between vehicle wheels and a steering wheel 510 to be omitted and the SBW system 900 is configured to adjust the tilting angle of the vehicle wheels by transmitting a driver's steering intention by use of electrical signals.

Referring to FIG. 2, the steering wheel 510 is provided with a steering motor M1. When the driver rotates the steering wheel 510, the steering motor M1 can generate torque to provide an appropriate reaction force depending on the situation, and a steering signal is generated by the torque applied to the steering wheel 510 by the driver.

The tilting angle of the vehicle wheels may be varied by transmitting the generated steering signal to the SBW system 900. The base unit 300 is connected to the SBW system 900 via a wire and other known connecting devices. Furthermore, the base unit 300 may be provided with a first connector C1, the steering column 530 of the steering unit 500 may be provided with a second connector C2, and when the first connector C1 and the second connector C2 are connected to each other, the base unit 300 and the steering unit 500 may be electrically interconnected.

The steering signal generated from the rotation of the steering wheel 510 may be transmitted to the base unit 300 through the electrical connection, and the base unit 300 may transmit the steering signal to the SBW system 900.

With the present method, in the manual driving mode, the moving direction of the vehicle may be adjusted by adjusting the tilting angle of the vehicle wheels.

Meanwhile, a lamp 511 configured to emit light or a speaker 513 configured to emit sound may be mounted on the rear surface of the steering wheel 510. When the vehicle is parked or is in the autonomous driving mode in which the steering wheel 510 is not used, additional functions other than steering the vehicle may be performed via the lamp 511 or the speaker 513 provided on the steering wheel 510.

For example, as illustrated in FIG. 3, when the vehicle is not being driven or is in the autonomous driving mode, the steering unit 500 may be used as a mood light or as a light that provides light necessary for reading by positioning the steering unit 500 at the rearmost end portion of the rail, adjusting the tilting angle of the steering unit 500, and operating the lamp 511.

Alternatively, as illustrated in FIG. 4, when watching content, sound included in the content may be emitted from the speaker 513 mounted on the rear surface of the steering unit 500.

In the present way, by performing the additional functions of the steering unit 500, it is possible to transform the interior of the vehicle into a space for various activities.

Meanwhile, a touch sensor 517 configured to control ON/OFF of the lamp 511 may be provided on the front surface of the steering wheel 510. A user (or driver) may control the ON/OFF of the lamp 511 by touching the touch sensor provided on the front surface of the steering wheel 510. When the user is driving the vehicle in the manual driving mode, the controller 700 electrically connected to the touch sensor may be configured to determine whether the user is driving the vehicle while holding the steering wheel 510, and when it is determined that the driver is not holding the steering wheel 510, the touch sensor may emit a warning signal via the speaker 513.

Accordingly, when the vehicle is in the semi-autonomous driving mode, it may be determined whether the driver is holding the steering wheel 510 via the touch sensor 517.

A plurality of lamps 511 may be mounted on the rear surface of the steering wheel 510. The lamps may be provided one by one in the up, down, left and right directions along the circumference of the steering wheel 510. The lamp 511 may perform a plurality of functions. When the vehicle changes lanes or turns left/right, the lamp 511 located in the corresponding direction may blink.

Furthermore, the speaker 513 mounted on the rear surface of the steering wheel 510 may also perform various functions. For example, when the vehicle is determined to be in an emergency situation, including crossing a center line of the road or unintentionally changing lanes of the road, the speaker may emit sound at a frequency that causes vibration in the steering wheel 510.

Depending on the material of the steering wheel 510, the frequency range may vary, but sound in a general low-frequency band may be emitted so that the driver's attention may be awakened by vibration due to the predetermined frequency.

The steering wheel 510 is provided, in the center of the front surface thereof, with a holder 590, on which a user communication terminal 20 configured for communicating with the vehicle is mounted. The user communication terminal 20 may be a smartphone, and when the user communication terminal 20 is mounted on the holder 590, the user communication terminal 20 may be connected to the vehicle via a known communication scheme such as Bluetooth to communicate with the vehicle.

A groove may be formed on the holder 590, and an elastic object may be provided in the groove, so that the user communication terminal 20 may be placed on the holder 590 while lifting the object upward. A known smartphone mounting scheme may be used to mount the user communication terminal 20 so that the user communication terminal does not fall off the steering wheel 510.

Meanwhile, a wireless charging system may be provided inside the holder 590, so that when the mounted user communication terminal 20 supports wireless charging, the user communication terminal may be wirelessly charged via the wireless charging system.

Accordingly, it is possible to charge the battery of the user communication terminal 20 simultaneously when watching content while using the steering wheel 510 as a holder 590 for the user communication terminal 20.

Furthermore, the user communication terminal 20 mounted on the holder 590 may function as a cluster of the vehicle. That is, when the user communication terminal 20 is mounted on the holder 590, the user communication terminal 20 may be connected to the vehicle to display information related to the current vehicle status.

For example, the user communication terminal 20 may display information related to the current driving speed of the vehicle, the capacity of battery currently mounted on the vehicle or a fuel residual amount, a battery voltage status, a coolant temperature, mileage, or engine RPM.

Meanwhile, referring to FIG. 2, the base unit 300 may be provided with a sliding motor M2 configured to move the base unit 300 along the rail 100. When the sliding motor M2 operates, the base unit 300 may move along the rail 100 provided on the crash pad 10, and accordingly, the position of the base unit 300 may be adjusted.

Furthermore, the steering unit 500 and the base unit 300 may be hingedly connected to each other at a hinge axis of the steering unit 500 and the base unit 300, and a tilting motor M3 may be coupled to the hinge axis. The steering unit 500 or the base unit 300 may be provided with the tilting motor M3 configured to adjust the tilting angle of the steering unit 500. The tilting motor M3 may be provided in either the steering unit 500 or the base unit 300 to adjust the tilting angle of the steering unit 500 coupled to the base unit 300. When the tilting motor M3 is provided in the steering unit 500, the tilting motor may be provided in the steering column 530 of the steering unit 500, and when the tilting motor M3 operates, the steering column 530 rotates about the base unit 300 and the tilting angle is adjusted.

Furthermore, the steering unit 500 or the base unit 300 may be provided with a telescopic motor M4 configured to adjust the length of the steering unit 500 in the front and rear direction thereof. The telescopic motor M4 may be provided in the steering unit 500 or the base unit 300 to adjust the length of the steering unit 500 in the front and rear direction thereof.

When the telescopic motor M4 is provided in the steering unit 500, the telescopic motor may be provided in the steering column 530 of the steering unit 500, and when the telescopic motor M4 operates, the steering column 530 may move away from the base unit 300 or toward the base unit 300 so that the length of the steering unit 500 in the front and rear direction is adjusted.

The telescopic motor may move the steering column by a ball nut-screw method. That is, a ball nut is provided in the steering column and coupled to the screw, and when the telescopic motor rotates the screw, the steering column can move while the ball nut moves on the screw.

In the present way, the controller 700 may apply power to the sliding motor M2, the tilting motor M3, and the telescopic motor M4 to move the base unit 300 on the rail 100, to rotate the steering unit 500 about the base unit 300, or to adjust the length of the steering unit 500 in the front and rear direction thereof.

The user may directly adjust the position of the base unit 300, the tilting angle of the steering unit 500, or the length of the steering unit 500 in the front and rear direction via the controller 700, but may adjust the position of the base unit 300, the tilting angle of the steering unit 500, or the length of the steering unit 500 in the front and rear direction via the user communication terminal 20 which is configured for communicating with the vehicle.

The user stores the position of the base unit 300, the tilting angle of the steering unit 500, or the length of the steering unit 500 in the front and rear direction to have specific values in the controller 700 or the user communication terminal 20 so that a plurality of modes may be implemented. The plurality of modes may be modes set in the vehicle by default, or may be modes set directly by the user.

For example, referring to FIG. 3, the user may set the autonomous driving mode of the vehicle. When the autonomous driving mode is selected by the user, the base unit 300 may be slid along the rail away from the driver. At the instant time, the position where the base unit 300 moves may vary depending on the stored value, and not only the movement of the base unit 300, but also the tilting angle of the steering unit 500 and the length of the steering unit 500 in the front and rear direction may be adjusted.

Even if the user sets the vehicle to the autonomous driving mode, the user may change the autonomous driving mode to the manual driving mode, and the autonomous driving mode may be released depending on the surrounding environment. If the driving mode is changed to the manual driving mode or the autonomous driving mode is released depending on the surrounding environment, as illustrated in FIG. 5, the base unit 300 may be slid along the rail to approach the driver, and when it is determined that the driver of the vehicle may directly control the steering unit 500, the vehicle may enter the manual driving mode or the autonomous driving mode may be released.

Meanwhile, the plurality of modes may include an internal mode. The internal mode may be selected along with the selection of the autonomous driving mode. Referring to FIG. 3, when the internal mode is selected, the angle formed by the base unit 300 and the steering unit 500 becomes 180 degrees, and the lamp 511 mounted on the rear surface of the steering wheel 510 included in the steering unit 500 may emit light, or the speaker 513 mounted on the rear surface of the steering wheel 510 may emit music.

Furthermore, the plurality of modes include a content watching mode, and when the content mode is selected, the angle formed by the base unit 300 and the steering unit 500 becomes 90 degrees or less than the 90 degrees, and the base unit 300 slides along the rail to be spaced from the driver with a predetermined distance.

The content mode may be selected simultaneously with the selection of the autonomous driving mode, and may be selected alone when the vehicle is parked so that the vehicle interior may be transformed into a space for watching content.

In one of the plurality of modes described above, the base unit 300 may move on the rail 100 depending on the stored value, and the moving position may vary depending on the stored value. Furthermore, it is possible to set not only the movement of the base unit 300, but also the tilting angle of the steering unit 500 and the length of the steering unit 500 in the front and rear direction, and the tilting angle of the steering unit 500 and the length of each steering unit in the front and rear direction may be adjusted depending on the values set by the user.

Meanwhile, the steering unit 500 is detachable/attachable from/to the base unit 300. Furthermore, the steering unit 500 may be provided at a plurality of points within the vehicle. For example, in a vehicle, known connecting devices for supplying power to the steering unit 500 may be provided at a plurality of points, and the steering unit 500 may be connected to a connecting device to receive power.

The steering unit 500 provided other than the base unit 300 may function as a lamp 511 or a speaker 513. That is, the steering unit 500 may be provided at a point other than the base unit 300 in the vehicle and perform additional functions by acting as a light or a speaker.

Figure 6:
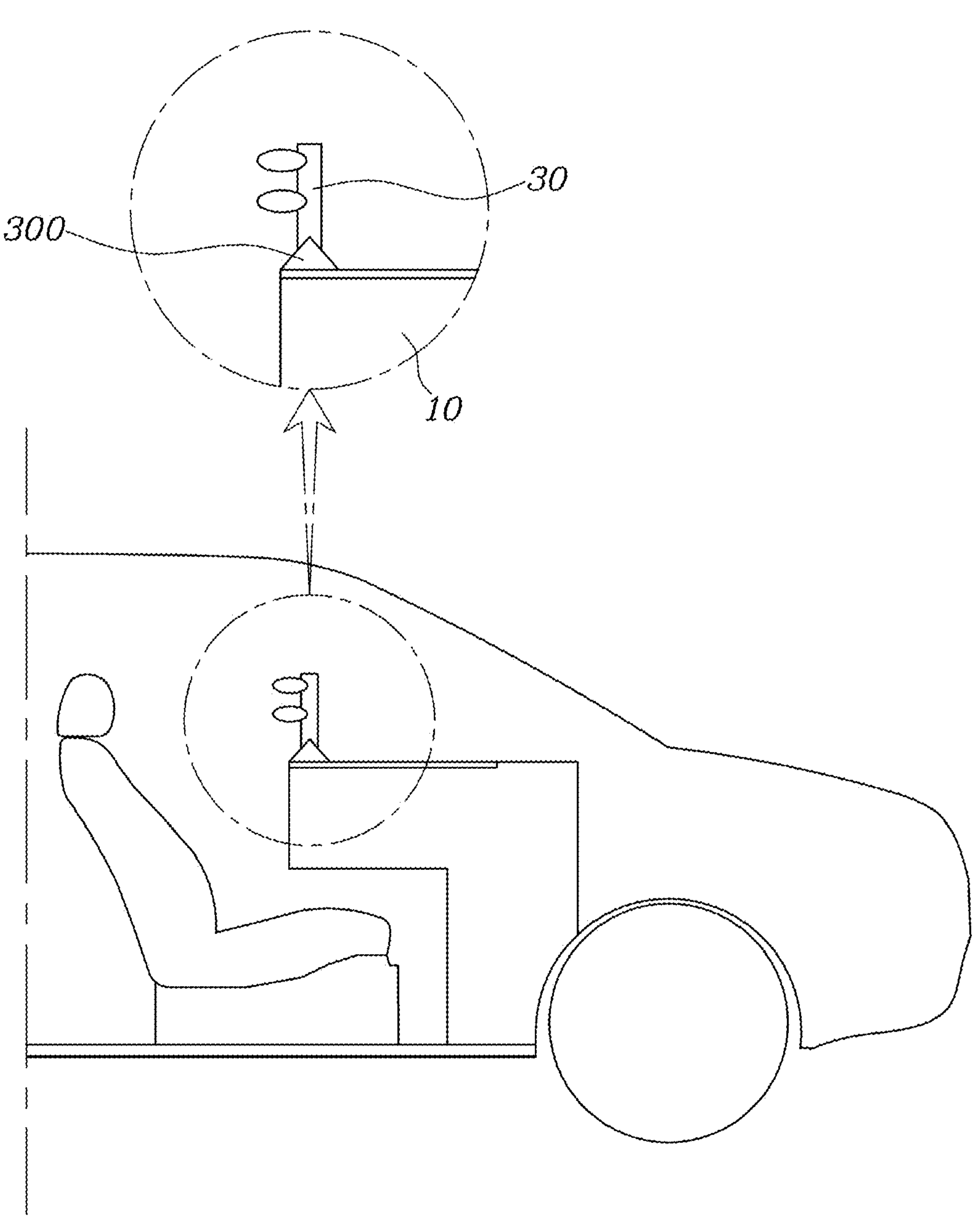
FIG. 6 is another accessories attached to a base unit from which the steering unit has been detached.

Referring to FIG. 6, a plurality of accessories may be detached/attached from/to the base unit 300 where the steering unit 500 is detached/attached. For example, a cup holder 30 configured for being heated/refrigerated may be attached to the base unit 300 to increase or decrease the temperature of the beverage in the cup holder 30.

With the plurality of steering devices of the present disclosure described above, user convenience may be increased depending on a plurality of modes such as an autonomous driving mode and a manual driving mode.

Furthermore, the term related to a control device such as "controller", "control apparatus", "control unit", "control device", "control module", "control circuit", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, unless stated otherwise, a singular expression includes a plural expression unless the context clearly indicates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

Hereinafter, the fact that pieces of hardware are coupled operably may include the fact that a direct and/or indirect connection between the pieces of hardware is established by wired and/or wirelessly.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A steering apparatus for a vehicle, the steering apparatus comprising:

a rail provided on a dashboard of the vehicle;

a base unit having a first end coupled to the rail and a second end coupled to the steering assembly, the base unit being movable along the rail;

a steering assembly coupled to the base unit and configured to adjust a moving direction of the vehicle; and a controller operatively connected to the base unit and the steering assembly and configured to adjust at least one of a position of the base unit and a tilting angle of the steering assembly.

2. The steering apparatus of claim 1, wherein the steering assembly includes:

a steering wheel configured to adjust the moving direction of the vehicle; and a steering column coupled to the base unit to interconnect the steering wheel and the base unit.

3. The steering apparatus of claim 2, wherein the steering wheel includes, on a rear surface of the steering wheel, at least one of a lamp configured to emit light and a speaker configured to emit sound.

4. The steering apparatus of claim 3, wherein the steering wheel includes, on a front surface of the steering wheel, a touch sensor configured to control ON/OFF of the lamp.

5. The steering apparatus of claim 4, wherein the controller electrically connected to the touch sensor is configured to determine whether a driver is holding the steering wheel in response that the vehicle is in a semi-autonomous driving mode.

6. The steering apparatus of claim 3, wherein the lamp is in plural and in response that the vehicle changes lanes or turns left or right, the controller is further configured to blink a lamp located in a corresponding direction among the plurality of lamps.

7. The steering apparatus of claim 3, wherein, in response that the vehicle is determined to be in an emergency situation, including crossing a center line or unintentionally changing lanes, the controller is further configured to emit sound at a frequency that causes vibration in the steering wheel.

8. The steering apparatus of claim 2, wherein the steering wheel includes, in a center of a front surface of the steering wheel, a holder on which a user communication terminal configured to communicate with the vehicle is mounted.

9. The steering apparatus of claim 8, wherein the holder is provided with a wireless charging system therein to wirelessly charge the user communication terminal in a state that the mounted user communication terminal supports wireless charging.

10. The steering apparatus of claim 8, wherein the user communication terminal mounted on the holder is configured to display vehicle status information including a vehicle speed, a capacity of a battery mounted on the vehicle, or a fuel residual amount.

11. The steering apparatus of claim 1, further including a steer-by-wire (SBW) system, wherein the base unit includes a first connector, the steering assembly includes a second connector, the first connector and the second connector are connected to each other to electrically interconnect the base unit and the steering assembly, and the first connector is configured to transmit a steering signal generated from the steering assembly, to the SBW system.

12. The steering apparatus of claim 1, wherein the base unit includes a sliding motor engaged to the rail and configured to move the base unit along the rail.

13. The steering apparatus of claim 1, wherein a tilting motor is provided at the steering assembly or the base unit, the tilting motor being configured to adjust the tilting angle of the steering assembly.

14. The steering apparatus of claim 1, wherein a telescopic motor is provided at the steering assembly or the base unit, the telescopic motor being configured to adjust a length of the steering assembly in a predetermined direction.

15. The steering apparatus of claim 1, wherein, in response that the vehicle is in an autonomous driving mode, the controller is further configured to slide the base unit along the rail away from a driver.

16. The steering apparatus of claim 1, wherein, in response of switching the vehicle from an autonomous driving mode to a manual driving mode or canceling the autonomous driving mode, the controller is further configured to slide the base unit along the rail toward a driver.

17. The steering apparatus of claim 1, wherein, during an internal mode, the controller is further configured to control a lamp provided on a rear surface of the steering wheel included in the steering assembly to emit light toward the dashboard, or a speaker mounted on the rear surface of the steering wheel to emit sound.

18. The steering apparatus of claim 1, wherein, during a content watching mode, an angle between the base unit and the steering assembly is 90 degrees or less than the 90 degrees, and the controller is further configured to slide the base unit along the rail to be spaced from a driver with a predetermined distance.

19. The steering apparatus of claim 1, wherein the steering assembly is configured to be attached to or detached from the base unit and to be provided at a plurality of points within the vehicle.

20. The steering apparatus of claim 19, wherein the base unit is configured so that a plurality of accessories including a cup holder configured to be heated or refrigerated are attached to or detached from the base unit.

* * * * *